(12) United States Patent
Falkner

(10) Patent No.: US 11,125,367 B2
(45) Date of Patent: Sep. 21, 2021

(54) REMOVABLE CUFF FOR CAPTURING THE MALE THREADED END OF A HOSE BIB AND OBSTRUCTING A FEMALE THREADED END OF A HOSE

(71) Applicant: Joshua Dietrich Falkner, Pensacola, FL (US)

(72) Inventor: Joshua Dietrich Falkner, Pensacola, FL (US)

( * ) Notice: Subject to any disclaimer, the term of this patent is extended or adjusted under 35 U.S.C. 154(b) by 578 days.

(21) Appl. No.: 15/873,003

(22) Filed: Jan. 17, 2018

(65) Prior Publication Data

US 2019/0219206 A1    Jul. 18, 2019

(51) Int. Cl.
*F16L 35/00* (2006.01)
*F16B 41/00* (2006.01)

(52) U.S. Cl.
CPC ............ *F16L 35/00* (2013.01); *F16B 41/007* (2013.01)

(58) Field of Classification Search
CPC .............................. F16L 35/00; F16L 2201/20
USPC ........................................ 285/8, 80, 373, 419
See application file for complete search history.

(56) References Cited

U.S. PATENT DOCUMENTS

| | | | | |
|---|---|---|---|---|
| 1,369,913 A | * | 3/1921 | Brunhoff ................. | E21B 33/08 166/81.1 |
| 1,870,040 A | * | 8/1932 | Dietze ..................... | F16B 39/10 292/307 B |
| 1,928,570 A | * | 9/1933 | Mustico ................. | F16L 55/172 138/99 |
| 2,048,424 A | * | 7/1936 | Caldwell ............... | F16L 19/005 70/232 |
| 2,240,860 A | * | 5/1941 | Rose ...................... | F16B 41/007 292/307 B |
| 3,982,779 A | * | 9/1976 | Hickey ................... | F16L 21/06 285/328 |
| 4,176,756 A | * | 12/1979 | Gellman .............. | B65D 51/002 215/274 |
| 4,826,215 A | * | 5/1989 | Sullivan ................ | F16B 41/005 285/373 |
| 8,632,103 B2 | * | 1/2014 | Fahie ...................... | F16L 37/18 285/80 |
| 2014/0360593 A1 | * | 12/2014 | Holtby .................... | F16L 35/00 137/312 |

* cited by examiner

*Primary Examiner* — Matthew Troutman
*Assistant Examiner* — Fannie C Kee
(74) *Attorney, Agent, or Firm* — Tiffany C. Miller; Inventions International Inc.

(57) ABSTRACT

A removable cuff having a locking mechanism is configured to capture an end of a hose bib and obstruct an end of a hose. The removable cuff has a first portion connected to a second portion. The first portion and second portion of the removable cuff are mirrored, whereby, the first portion and the second portion each have at least a portion of a locking mechanism and a first opening bordering a flange located opposite a second opening. The first opening bordering a flange has a smaller size perimeter than the size perimeter of the second opening. The first portion of the removable cuff and the second portion of the removable cuff are oriented in a closed orientation forming a chamber. The chamber houses the threaded portions of the hose bib and of the hose. The locking mechanism can be engaged to prevent removal of the hose.

2 Claims, 14 Drawing Sheets

REMOVABLE CUFF FOR CAPTURING THE MALE THREADED END OF A HOSE BIB AND OBSTRUCTING A FEMALE THREADED END OF A HOSE

BACKGROUND OF THE INVENTION

1. Field of the Invention

This invention relates, generally, to a removable cuff for capturing an end of a hose bib. More particularly, it relates to a removable cuff having a locking mechanism capable of capturing the male threaded end of a hose bib and obstructing access to the female threaded end of a hose.

2. Background Art

It is common for residential, industrial, and commercial settings including, but not limited to, a home or a marina, to have a threaded faucet or hose bib. A hose including, but not limited to, a water hose or a garden hose, has a female threaded portion that is removably connected to the hose bib having a male threaded end. The typical location of these hose bibs and hoses may be in an outdoor, unmonitored, common ground area, thus, leaving the removable hoses susceptible to theft or undesired relocation. It would be more desirable for the hose to be connected to the hose bib in a way that prevents an unauthorized user from removing the hose from the hose bib. Thus, there is a need for a barrier such as a cuff having a locking mechanism that is positioned to overlay the threaded portion of both the hose bib and the hose. The barrier is configured to prevent an unauthorized user from being able to disconnect the hose from the hose bib at their threaded portions.

Currently, duct tape is used as a barrier to make it difficult for an unauthorized user to remove the hose from the hose bib. Duct tape is not a very effective barrier, as an unauthorized user can still remove the tape. Further, duct tape is not reusable and can create a sticky mess when an authorized user intends to remove the hose from the hose bib. It would be more desirable to have a more effective and more eco-friendly barrier that will prevent theft or unwanted removal of a hose from a hose bib.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a removable cuff having a locking mechanism that captures the male threaded end of a hose bib and obstructs the female threaded end of a hose. The removable cuff has a first portion connected to a second portion that positions the removable cuff to be in an open configuration and in a closed configuration during installation and removal of the removable cuff from the hose bib. The first portion and second portion of the removable cuff can be mirrored, whereby, the first portion and the second portion each have at least a portion of a locking mechanism and a first opening bordering a flange located opposite a second opening. The first opening bordering a flange has a smaller size perimeter than the size of the second opening perimeter. The first portion of the removable cuff and the second portion of the removable cuff are oriented in a closed orientation forming a chamber. The chamber is configured to obstruct the female threaded portion of a hose when the female threaded end of the hose is connected to the male threaded end of the hose bib. The locking mechanism can be engaged to prevent removal of the hose which also includes improvements that overcome the limitations of prior art hose bib cuffs is now met by a new, useful, and non-obvious invention.

The novel removable cuff is configured to capture a male threaded end of a hose bib and obstruct a female threaded end of a hose. The removable cuff has a first portion having a first end located opposite a second end. The removable cuff has a second portion having a first end located opposite a second end. The first portion is connected to the second portion and can be oriented in an opened orientation or a closed orientation for installation or removal of the removable cuff from the hose bib. The first portion can slidably traverse at least a portion of the second portion of the removable cuff to orient the removable cuff into an open or closed orientation. The removable cuff also has a chamber formed when the first portion of the removable cuff and the second portion of the removable cuff are oriented in a closed orientation. The chamber is configured to obstruct the female threaded end of the hose when the removable cuff is connected to the hose bib.

The removable cuff has a capturing structure having a first recess bordering a first flange. The first recess bordering the first flange is located on the first end of the first portion of the removable cuff. The capturing structure has a second recess bordering a second flange. The second recess bordering the second flange is located on the first end of the second portion of the removable cuff. The removable cuff has a first opening formed when the first portion of the removable cuff and the second portion of the removable cuff are oriented in a closed orientation. The removable cuff has a second opening formed when the first portion of the removable cuff and the second portion of the removable cuff are oriented in a closed orientation. The first opening is located opposite the second opening. The first opening is smaller than the second opening. The removable cuff has at least a portion of a locking mechanism configured to be engaged to prevent removal of the hose from the hose bib.

In a preferred embodiment, the removable cuff has a first portion of the removable cuff being hingedly connected to the second portion of the removable cuff. The first and second portions can pivot forwards and backwards to orient the removable cuff in an open or closed orientation for removal or installation of the removable cuff onto a hose bib.

It is within the scope of this current invention for at least a portion of a locking mechanism to include, but not be limited to, an eyelet, a lock and key assembly, a padlock, a finger lock, a numerical lock, or a passcode. The eyelet is configured to be connected to a pad lock. Further, the first portion and the second portion of the removable cuff can each have an eyelet. A padlock can then be connected to both of the eyelets and locked to prevent the unwanted removal of the hose from the hose bib. Any locking mechanism can be incorporated into the removable cuff. For example, the removable cuff can have an opening. The opening can receive a turnkey that can engage or disengage the locking mechanism of the removable cuff. In another example, the opening can receive a fastener such as a screw. The screw can have an anti-tampering head.

In another embodiment, the removable cuff is configured to capture a male threaded end of a hose bib and obstruct a female threaded end of a hose. The removable cuff has a hose bib having a male threaded end. The removable cuff has a hose having a female threaded end. The male threaded end of the hose bib is removably connected to the female threaded end of the hose. The removable cuff has a first portion having a first end located opposite a second end. The removable cuff has a second portion having a first end located opposite a second end. The first portion is connected to the second portion and can be oriented in an open or closed configuration. The removable cuff has a chamber formed when the first portion of the removable cuff and the second portion of the removable cuff are oriented in a closed orientation. The chamber obstructs the female threaded end of said hose when the removable cuff is connected to the hose bib. The chamber has a size great enough in length and small enough in diameter to prevent an individual from being able to reach into the chamber to disconnect the hose from the hose bib. This obstruction prevents an unauthorized user from accessing the threaded portion of the hose so that the unauthorized user cannot unthread the hose from the hose bib in an attempt to remove the hose from the hose bib.

The removable cuff has a capturing structure having a first recess bordering a first flange. The first recess bordering the first flange is located on the first end of the first portion of the removable cuff. The capturing structure has a second recess bordering a second flange. The second recess bordering the second flange is located on the first end of the second portion of the removable cuff. The removable cuff also has a first opening formed when the first portion of the removable cuff and the second portion of the removable cuff are oriented in a closed orientation. The first and second recesses are positioned across from each other to form this first opening. The removable cuff has a second opening located opposite the first opening. The second opening is formed when the first portion of the removable cuff and the second portion of the removable cuff are oriented in a closed orientation. The first opening is smaller than the second opening because the smaller opening needs to contour the narrow portion of a hose bib so that the removable cuff can capture the male threaded end of the hose bib within the chamber of the removable cuff. The hose will protrude from the second opening of the removable cuff when both the removable cuff and the hose are connected to the hose bib. The removable cuff has at least a portion of a locking mechanism configured to be locked and unlocked to prevent unwanted removal of the hose from the hose bib.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
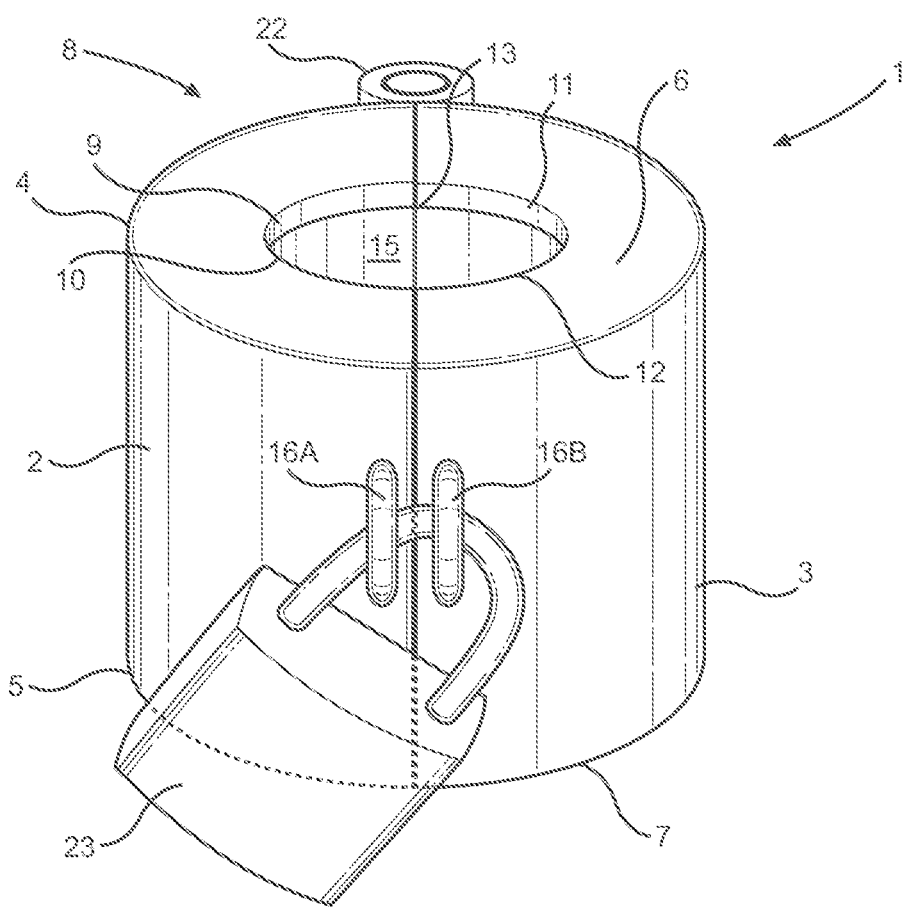
FIG. 1 is a perspective view of the novel removable cuff in a closed orientation with an eyelet locking mechanism engaged with a pad lock.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

FIGS. 1-6 illustrate removable cuff 1 having a hinge 22. First portion 2 of removable cuff 1 is hingedly connected 22 to second portion 3 of removable cuff 1. Locking mechanism comprises eyelets 16A and 16B located on an outer wall surface of first portion 2 and second portion 3 of removable cuff 1. Locking mechanism 16A and 16B each have an opening capable of receiving any lock including, but not limited to, a pad lock 23 (FIGS. 1-3, 6-7, and 9).

Figure 7:
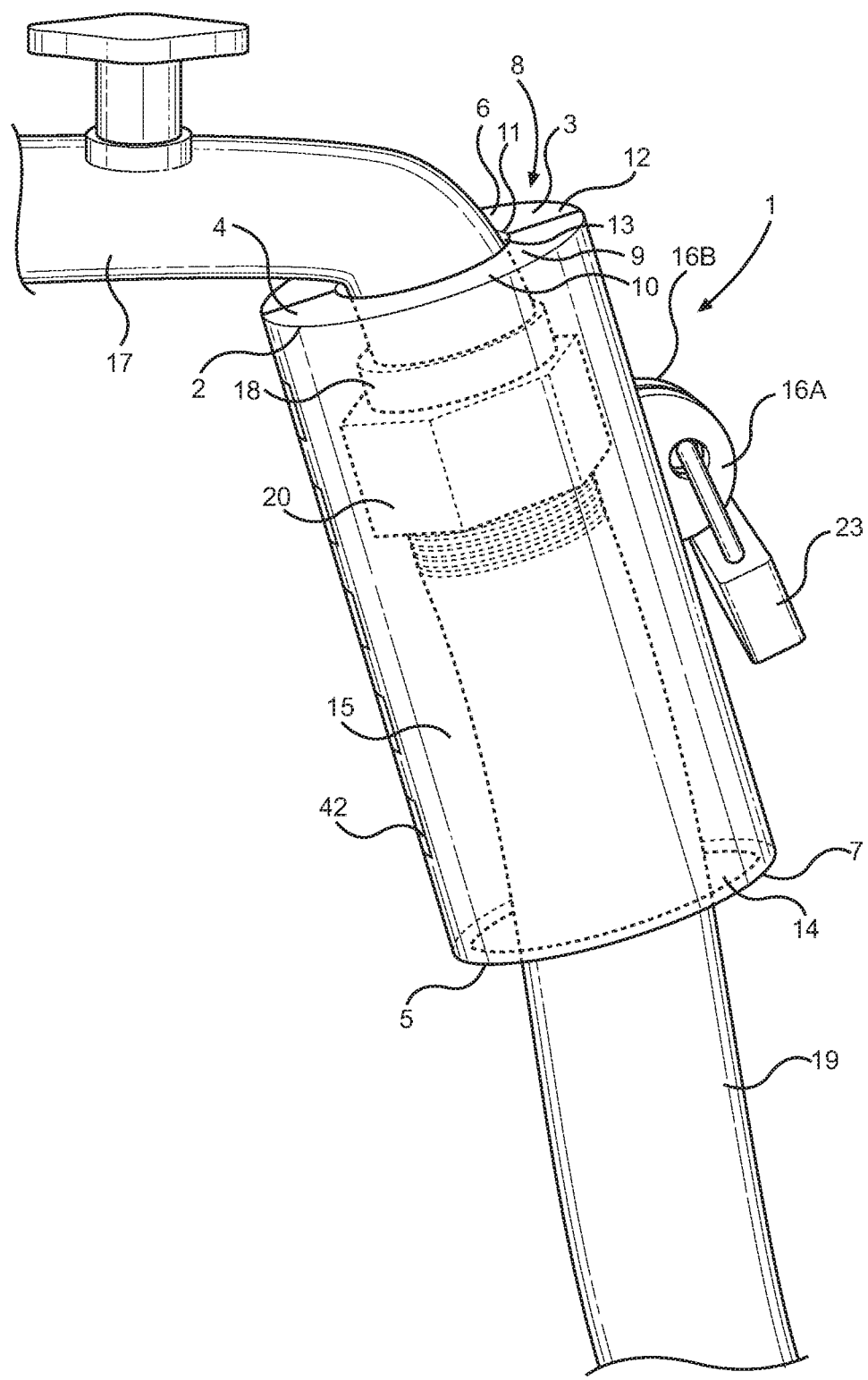
FIG. 7 is a perspective view of an alternate embodiment of the novel removable cuff having a closed configuration and capturing the male threaded end of a hose bib and obstructing the female threaded end of a hose.
Figure 8:
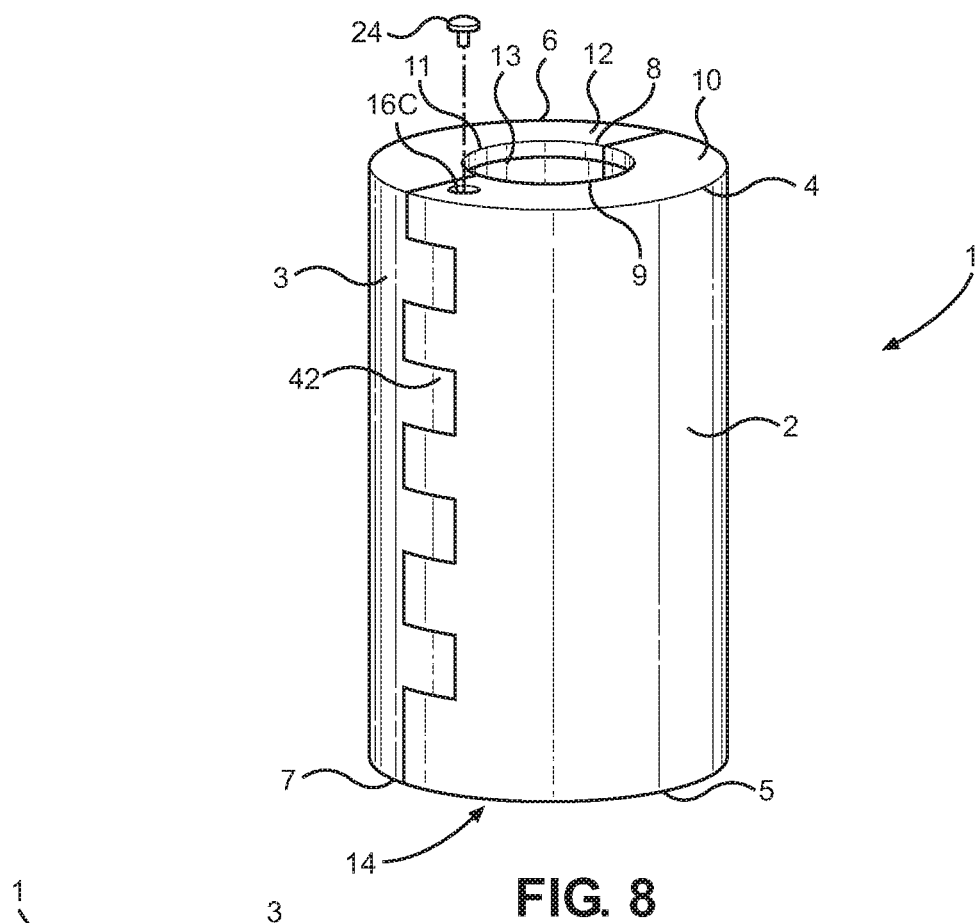
FIG. 8 is a perspective view of an alternate embodiment of the novel removable cuff having a closed configuration; and, FIG. 9 is a top perspective view of an alternate embodiment of the novel removable cuff having a closed configuration.
Figure 9:
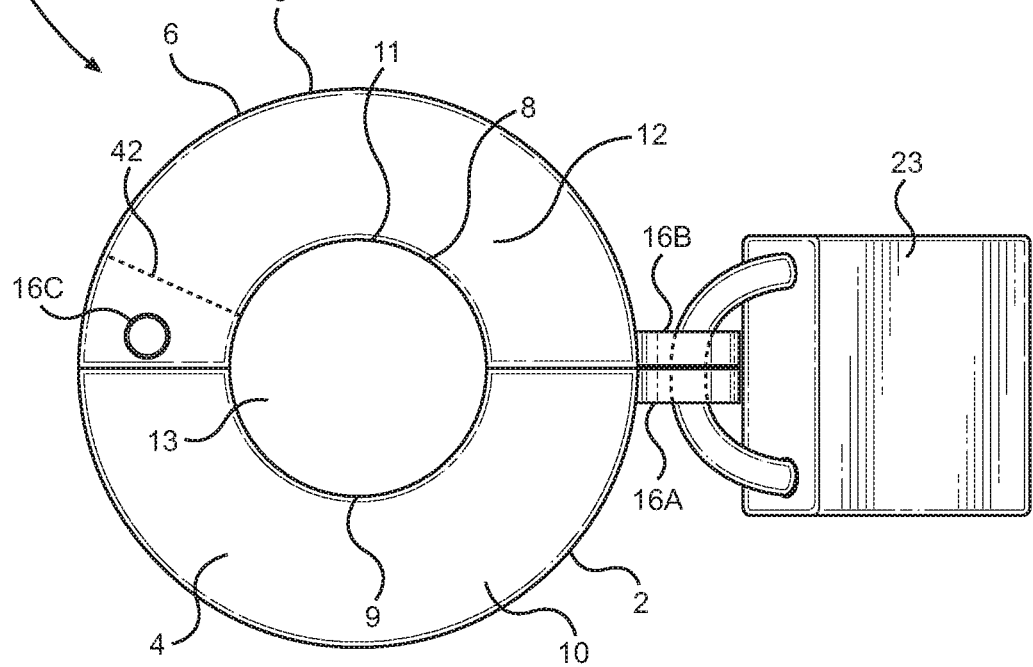

FIGS. 7-9 show removable cuff 1 not having a hinged structure. Rather, first portion 2 of removable cuff 1 slidably traverses 42 (FIGS. 7-9) at least a portion of second portion 3 of removable cuff 1. First portion 2 and second portion 3 are configured to slide to orient removable cuff 1 into an opened or closed orientation. FIGS. 7 and 9 illustrate locking mechanism being eyelets 16A and 16B located on an outer wall surface of first portion 2 and second portion 3 of removable cuff 1. Eyelets 16A and 16B each have an opening capable of receiving any lock including, but not limited to, a pad lock 23.

FIGS. 8-9 show locking mechanism comprises an opening 16C and fastener 24 (FIG. 8) to secure removable cuff 1 in a closed orientation. When fastener 24 is installed into opening 16C, removable cuff 1 is locked in a closed orientation and when fastener 24 is removed from opening 16C, removable cuff can be oriented to an open configuration. It is within the scope of this invention for removable cuff 1 to have at least one locking mechanism capable of securing removable cuff 1 in a closed orientation when connected to hose bib 17.

FIGS. 10-19 depict an alternate embodiment of removable cuff 1 having an novel hinge structure comprising first portion 2 having first hinge structure 25. First hinge structure 25 protrudes from first portion 2 of removable cuff 1. First hinge structure 25 has substantially central bore 27. First portion 2 has eyelet 16A connected to an outer wall surface. Eyelet 16A has an opening configured to receive a lock including but not limited to, a padlock. Second portion 3 of removable cuff 1 has second hinge structure 26. Second hinge structure 26 protrudes from at least a portion of second portion 3 of removable cuff 1.

In a general embodiment, FIGS. 1-10 show removable cuff 1 with first portion 2 having a first end 4 located opposite second end 5. It is within the scope of this invention for second end 5 to have hose retaining structure 33 (FIGS. 13A-15, 17, 18, and 20). Hose retaining structure 33 is a barrier which is an added feature which prevents an individual from tampering with the hose or hose bib connection. Hose retaining structure 33 also prevents small creatures such as lizards, spiders, or debris from entering chamber 15 (FIGS. 1, 2, 4, 5, 7, 10-11, 13A-14, 17, and 20) of removable cuff 1. Second portion 3 has first end 6 located opposite secondary end 7. Capturing structure 8 (FIGS. 1-20) has first recess 9 and first flange 10 located on first end 4 of first portion 2. First recess 9 borders first flange 10. Capturing structure 8 also has second recess 11 and second flange 12 located on first end 6 of second portion 3. Second recess 11 borders second flange 12.

Figure 5:
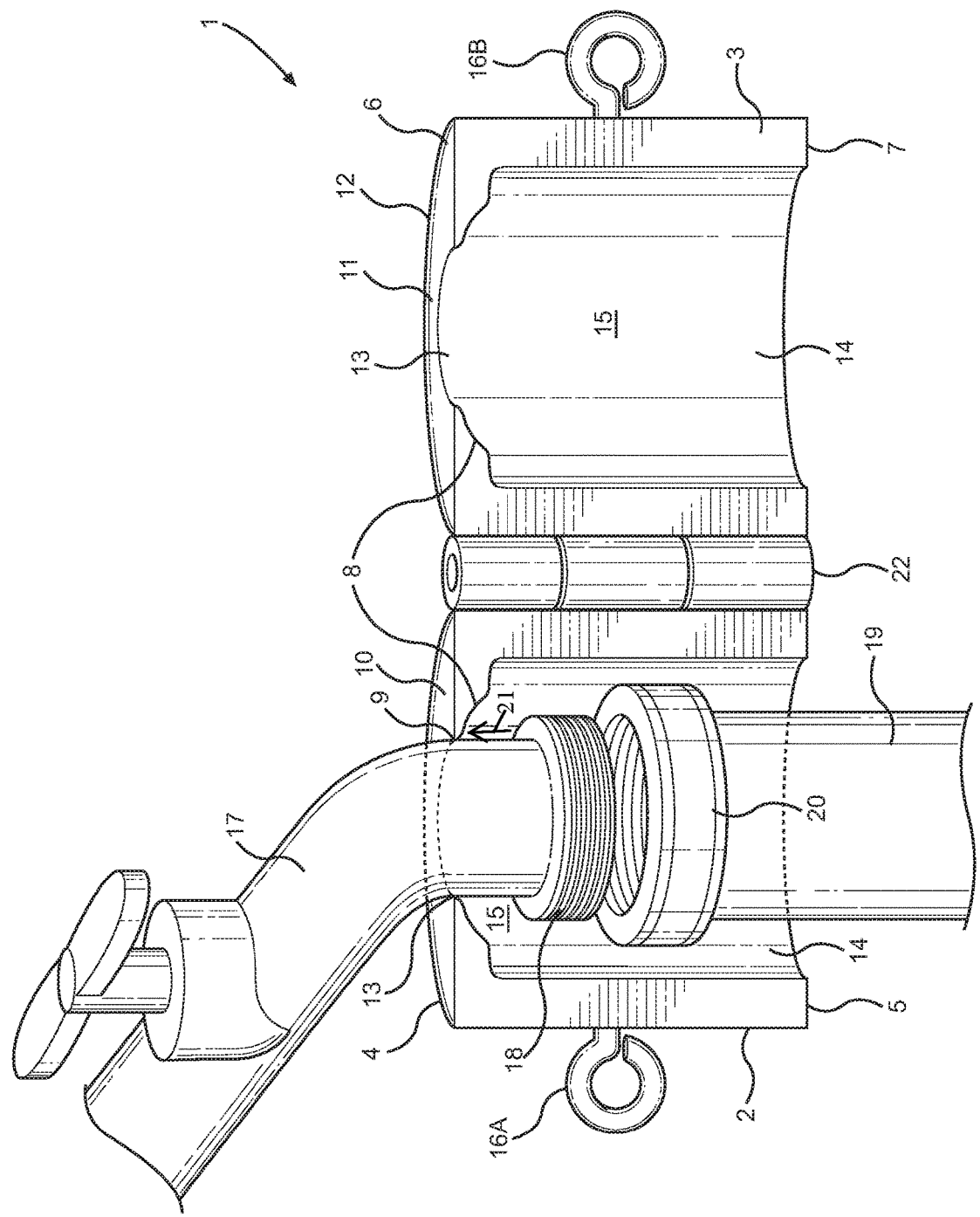
FIG. 5 is a perspective view of the novel removable cuff having an open configuration and positioned to capture the male threaded end of a hose bib and to obstruct a female threaded end of a hose.
Figure 6:
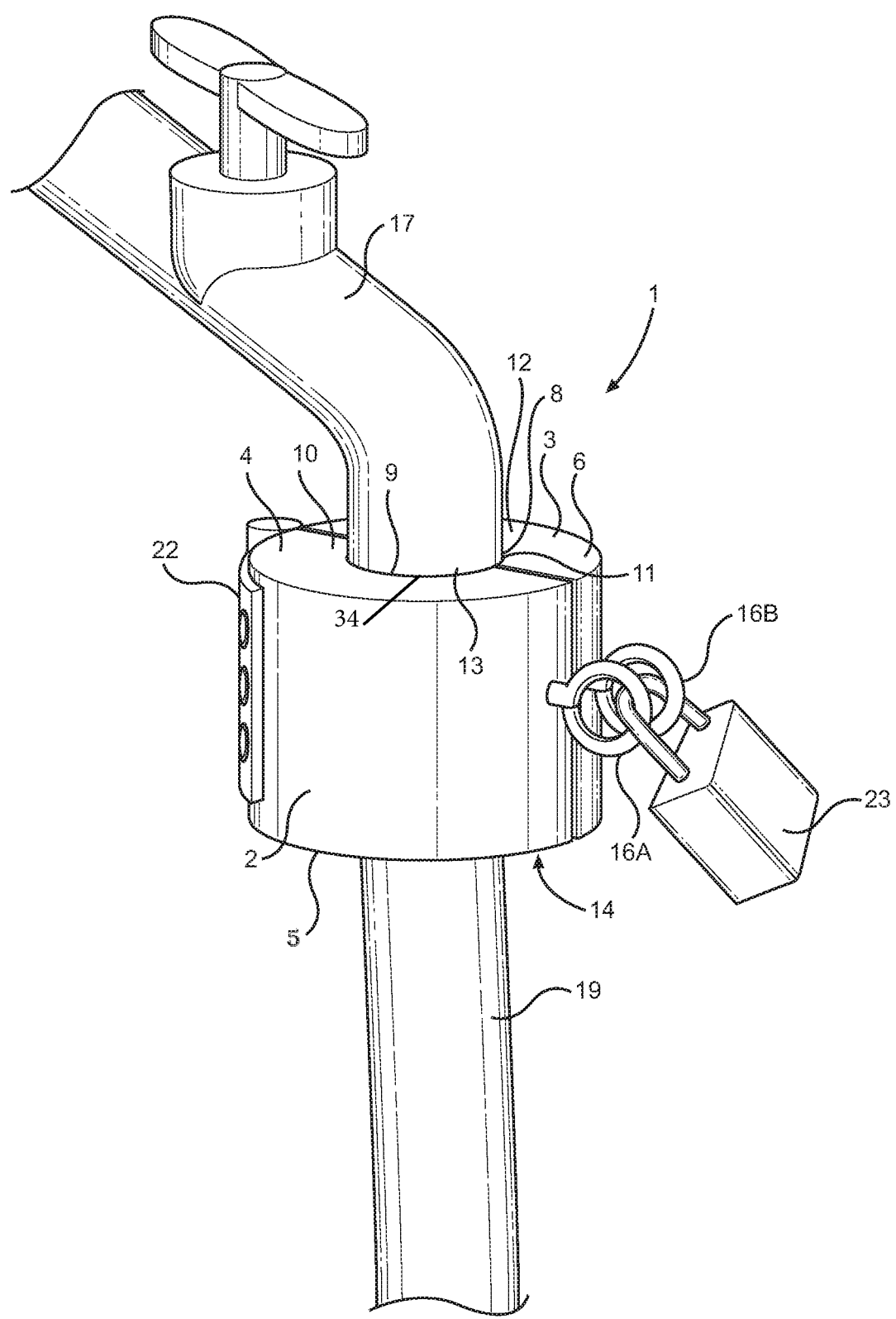
FIG. 6 is a perspective view of the novel removable cuff having a closed configuration and capturing the male threaded end of a hose bib and obstructing the female threaded end of a hose.

FIGS. 5-7 depict first flange 10 and second flange 12 contouring the narrow portion of hose bib 17 so that male threaded end 18 of hose bib 17 catches 21 (FIG. 5) or is captured by the flanges 10 and 12 of the removable cuff 1. When removable cuff 1 is oriented in a closed orientation, first opening 13 (FIGS. 1-3 and 8-9), second opening 14 (FIGS. 2 and 7-8), and chamber 15 (FIGS. 2 and 7) are formed. When first portion 2 and second portion 3 connect in a closed orientation, first recess 9 and second recess 11 are located across from each other to form first opening 13.

Figure 2:
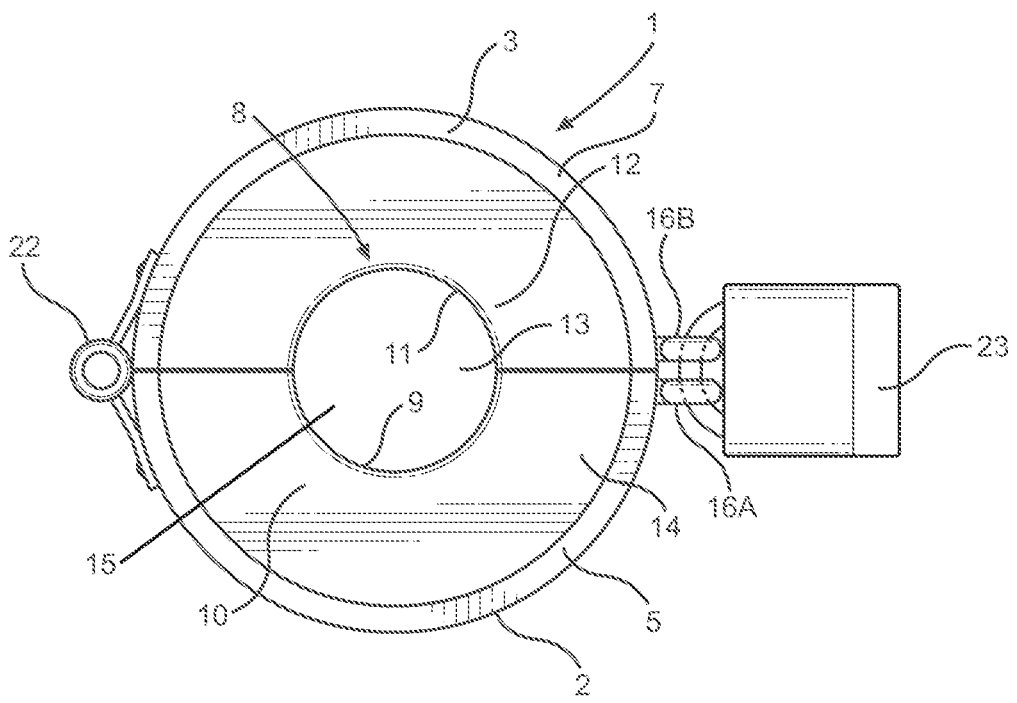
FIG. 2 is a bottom perspective view of the novel removable cuff in a closed orientation with an eyelet locking mechanism engaged with a pad lock.
Figure 3:
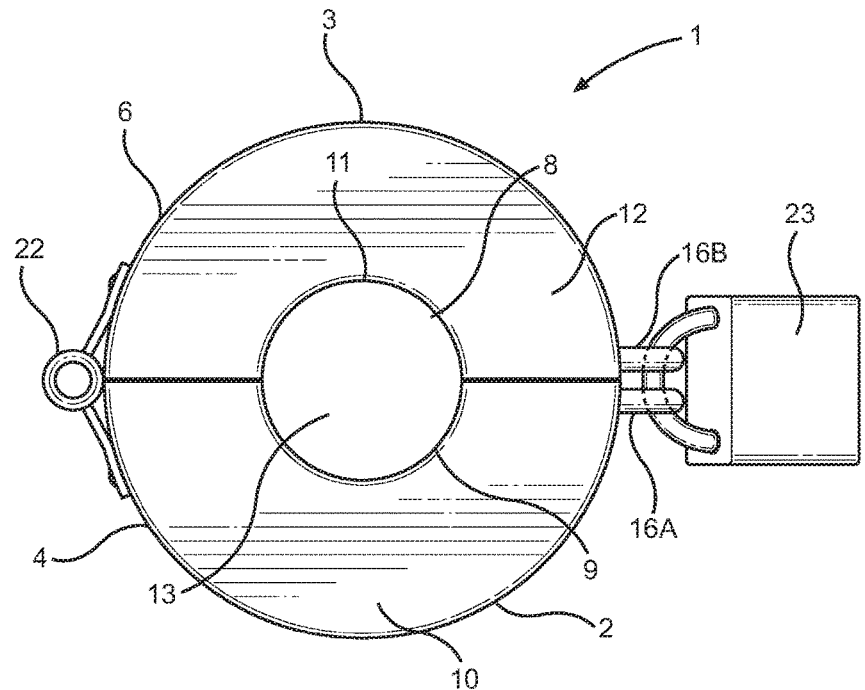
FIG. 3 is top perspective view of the novel removable cuff in a closed orientation with an eyelet locking mechanism engaged with a pad lock.
Figure 4:
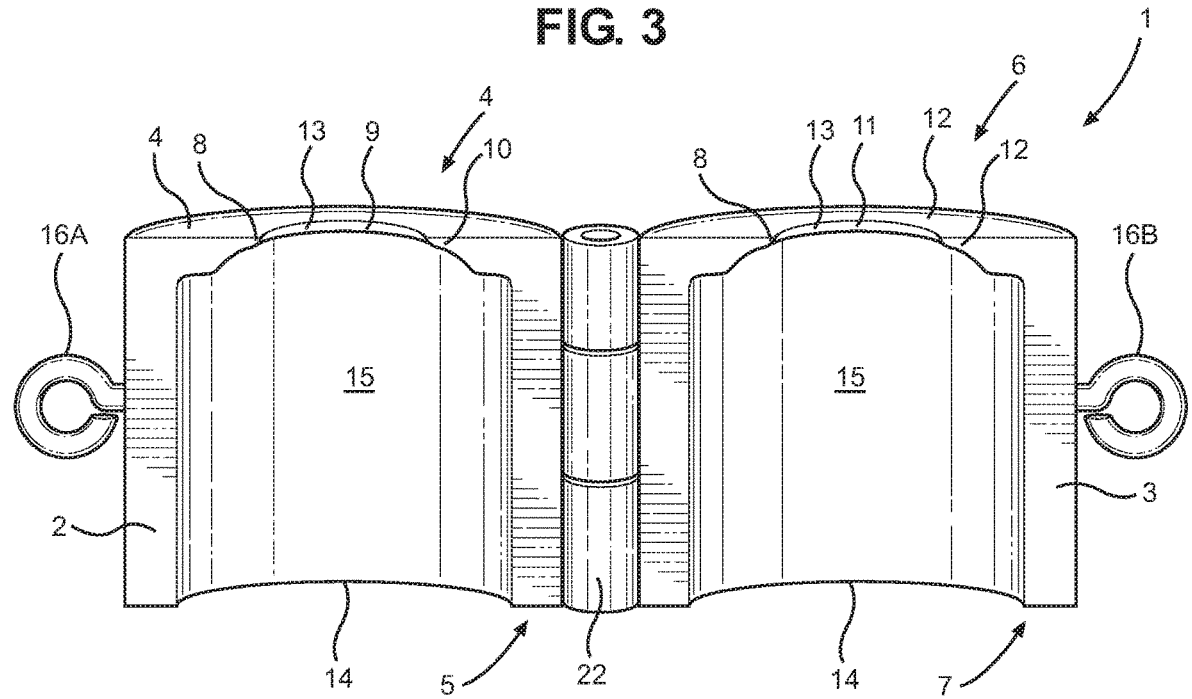
FIG. 4 is a side perspective view of the novel removable cuff having an open configuration.

First opening 13 (FIGS. 1-13, 12-19) is located opposite second opening 14 (FIGS. 1-8, 13A-15, 17, and 18). First opening 13 is smaller than second opening 14 because first opening 13 needs to connect to 34 (FIG. 6) the narrow portion of hose bib 17 (FIGS. 4-7), whereby, the male threaded end 18 (FIGS. 4-5 and 7) of hose bib 17 (FIGS. 4-5 and 7) is captured within chamber 15 (FIGS. 2 and 7). FIGS. 5 and 7 illustrate chamber 15 having a length great enough to obstruct an unauthorized user from being able to reach through second opening 14 and twist female threaded end 20 of hose 19 from male threaded end 18 of hose bib 17. First flange 10 and second flange 12 are retaining structures that keep removable cuff 1 connected to hose bib 17.

Removable cuff 1 cannot be pulled off of hose bib 17 when removable cuff 1 is installed onto hose bib 17 because male threaded end 18 of hose bib 17 is wider than first opening 13. The hose 19 (FIGS. 4-7) extends beyond and protrudes from second opening 14 of removable cuff 1. Removable cuff 1 is a barrier that obstructs an unauthorized user (not shown) from being able to accesses the female threaded end 20 of hose 19 for removal from hose bib 17. An unauthorized user includes, but is not limited to, a person not having a key or locking mechanism release, or a person not authorized to remove hose 19 from hose bib 17.

FIGS. 1-9 illustrate removable cuff having at least a portion of a locking mechanism such as eyelets 16. 16A (FIGS. 1-7 and 9) and 16B (FIGS. 1-7 and 9) are eyelets that receive padlock 23 (FIGS. 1-3, 6-7, and 9). FIGS. 8-9 illustrate locking mechanism comprises an opening 16C that is locked when a fastener 24 such as a screw or a screw having an anti-tampering head is installed into opening 16C. When an authorized user removes the fastener from opening 16C, the removable cuff can then be oriented in an open configuration for removal of the removable cuff from hose bib 17 to reveal female threaded end 20 of hose 19.

The locking mechanism can be a set of eyelets 16A and 16B connected to removable cuff 1. FIGS. 1-7, 9-10 illustrate first eyelet 16A can be connected to first portion 2 of removable cuff 1. The eyelets 16A and 16B can be oriented next to each other, such as parallel to each other to allow a lock such as pad lock 23 to pass through each opening of the eyelets 16A and 16B. The eyelets 16A and 16B can be oriented parallel or vertical in relation to removable cuff 1. FIGS. 1-7, and 9 show eyelets 16A and 16B being oriented in a vertical orientation, whereby, eyelets 16A and 16B are located side-by-side next to each other on removable cuff 1. FIGS. 10-19 depict removable cuff 1 having eyelets 16A and 16B oriented in a horizontal orientation, whereby, eyelet 16B is stacked on top of eyelet 16A.

FIGS. 10-19 illustrate removable cuff 1 having a novel hinge structure comprising first portion 2 of removable cuff 1 having first hinge structure 25. First hinge structure 25 protrudes from first portion 2 of removable cuff 1. First hinge structure 25 has a substantially central bore 27. Second portion 3 of removable cuff 1 has second hinge structure 26. Second hinge structure 26 protrudes from second portion 3 of removable cuff 1. Second hinge structure 26 has a protruding structure 28 (FIGS. 11, 13B, 17, 20, and 21) connected thereto, whereby, protruding structure 28 is configured to be retained by substantially central bore 27 of first hinge structure 25.

Figure 11:
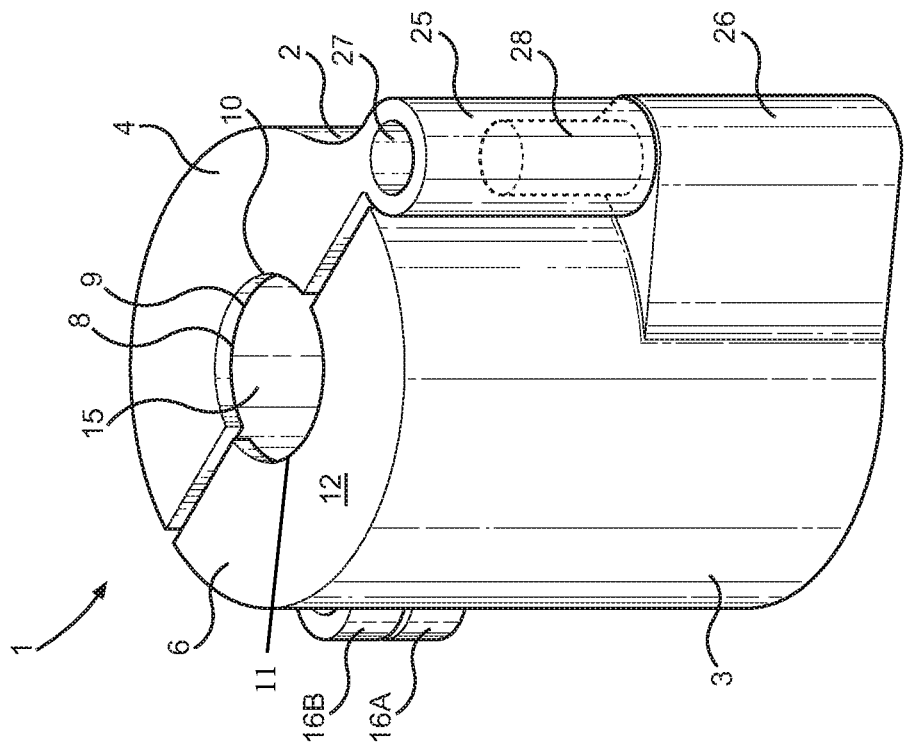
FIG. 11 is a rear perspective view of an alternate embodiment of the novel removable cuff having a hinge structure.
Figure 10:
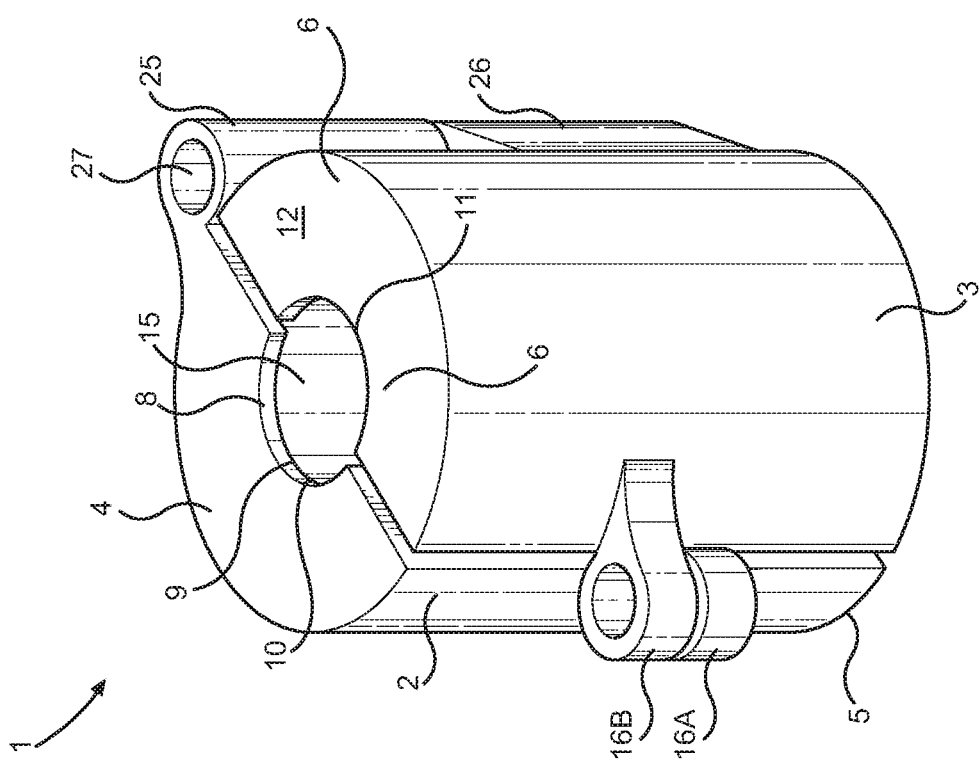
FIG. 10 is a front perspective view of an alternate embodiment of the novel removable cuff having a hinge structure.
Figure 12:
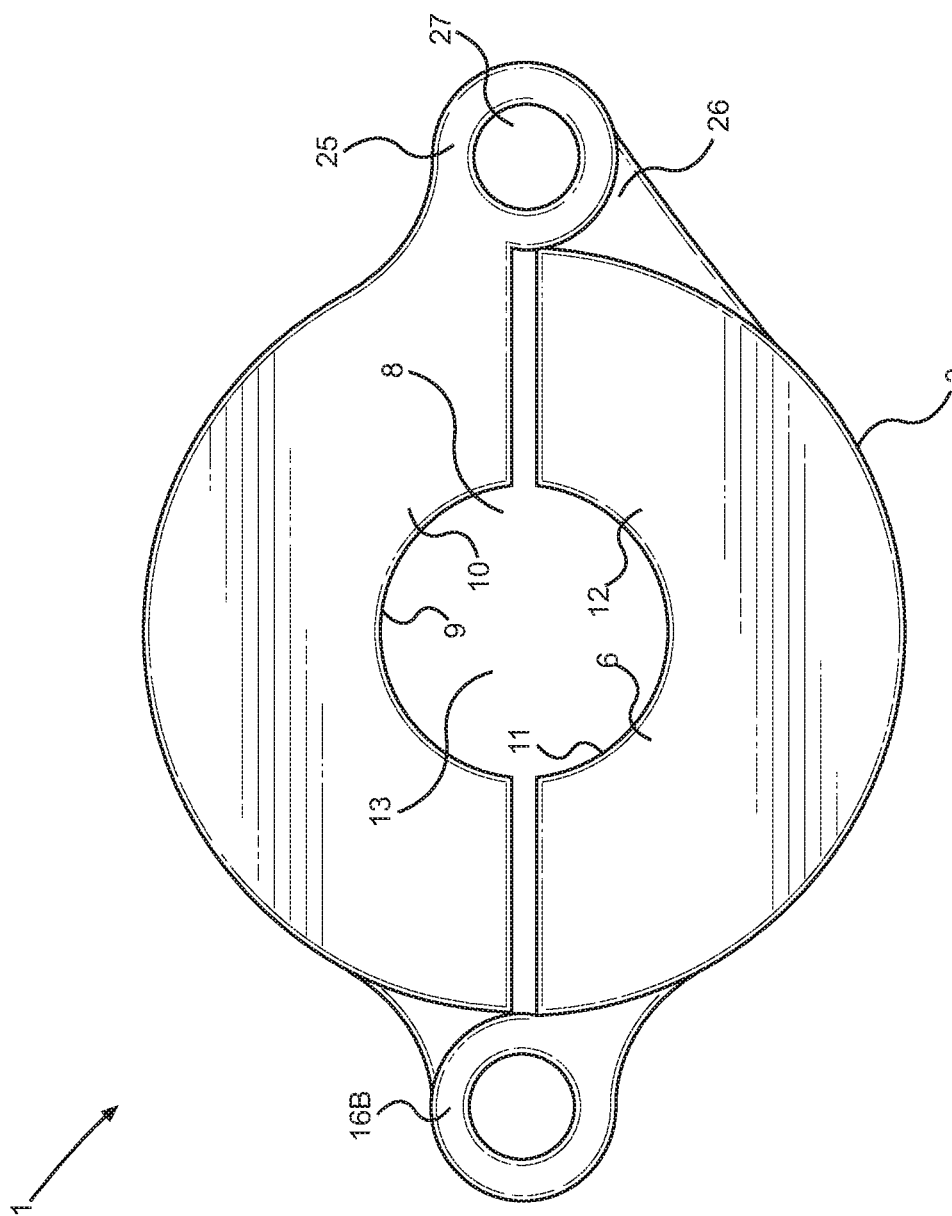
FIG. 12 is a top perspective view of an alternate embodiment of the novel removable cuff having a hinge structure.

FIGS. 10-12 illustrate first portion 2 of removable cuff 1 having first end 4. First end 4 of first portion 2 has first recess 9 and first flange 10. First end 6 of second portion 3 has second recess 11 and second flange 12. Capturing structure 8 is located on first end 4 of first portion 2 and first end 6 of second portion 3 of removable cuff 1.

Figure 13A:
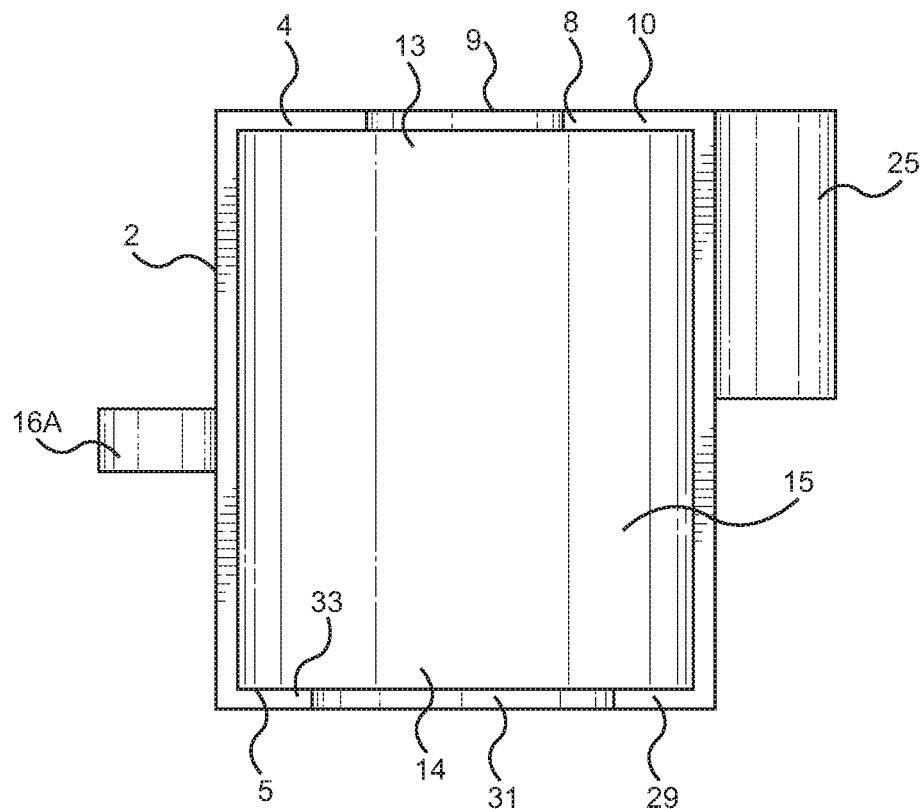
FIG. 13A is a side perspective view of an alternate embodiment of the novel removable cuff having a first portion with a primary hinge structure.
Figure 14:
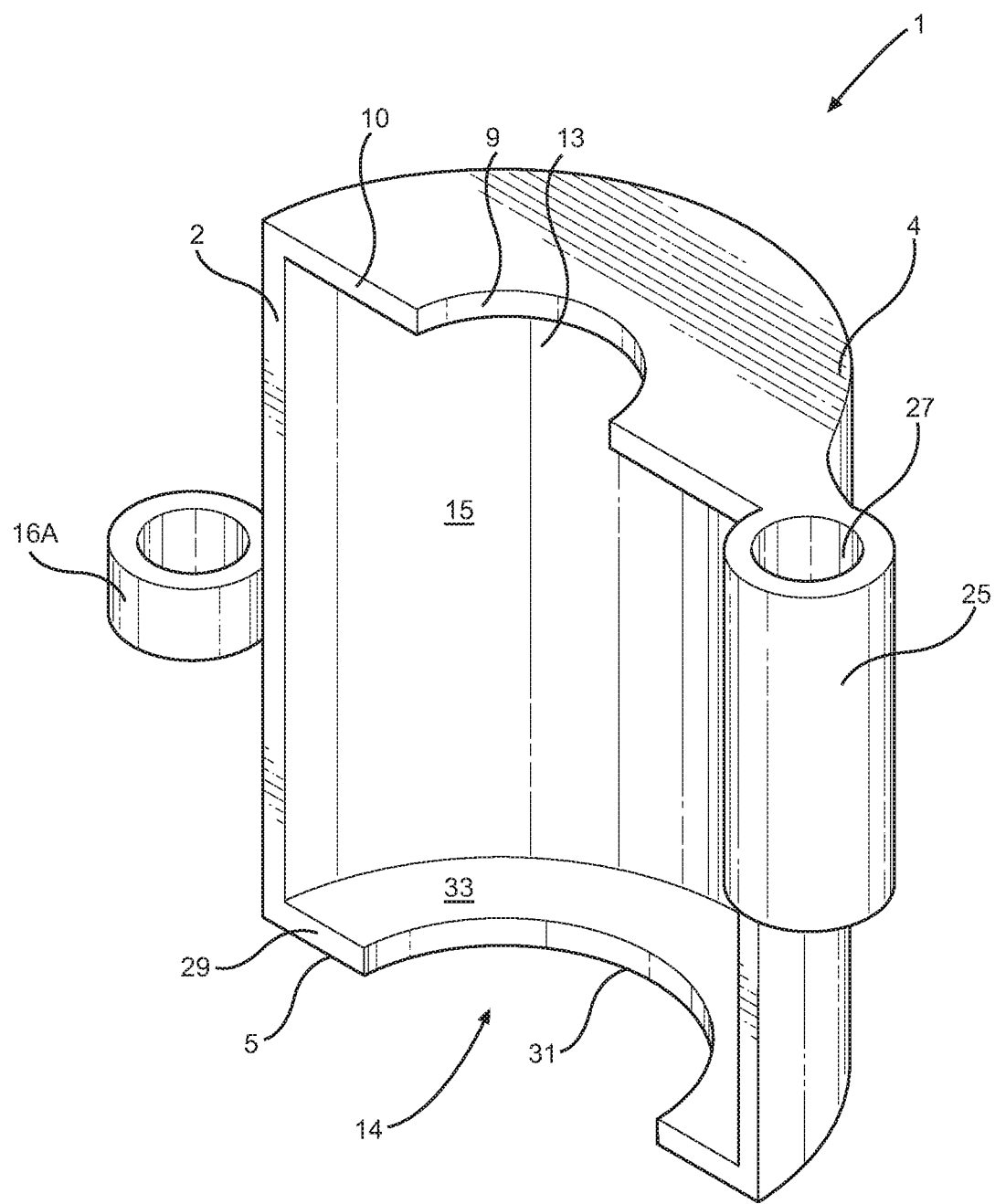
FIG. 14 is a rear perspective view of an alternate embodiment of the novel removable cuff having a first portion with a first hinge structure.
Figure 15:
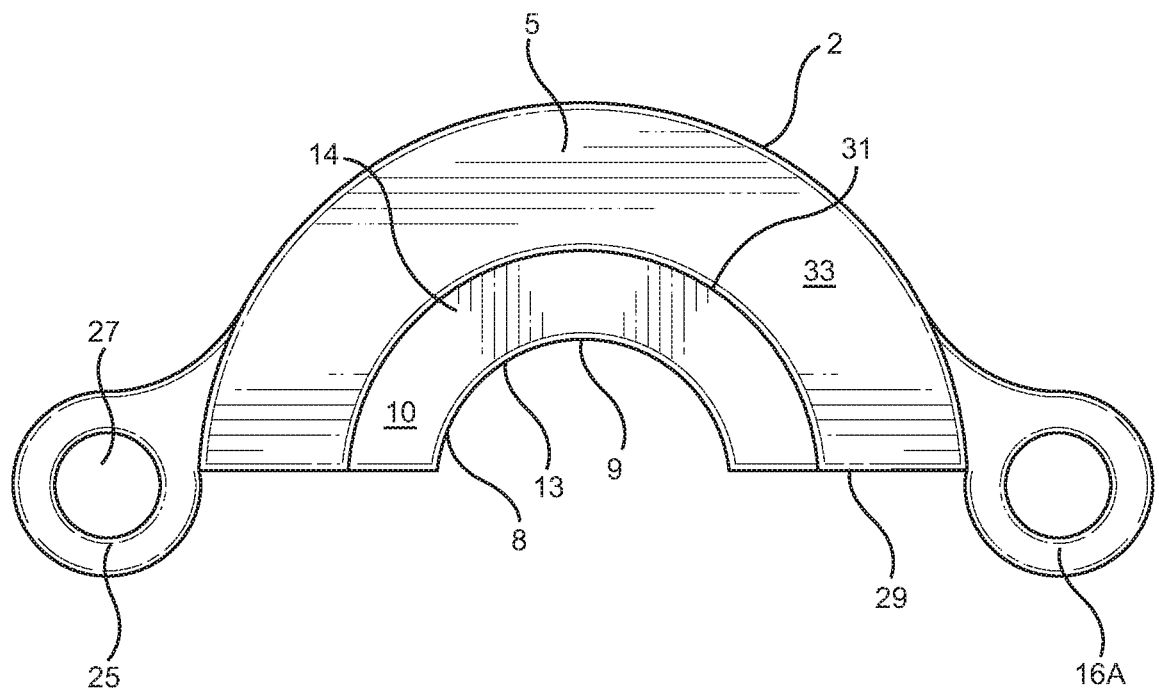
FIG. 15 is a bottom perspective view of an alternate embodiment of the novel removable cuff having a first portion with a first hinge structure.
Figure 16:
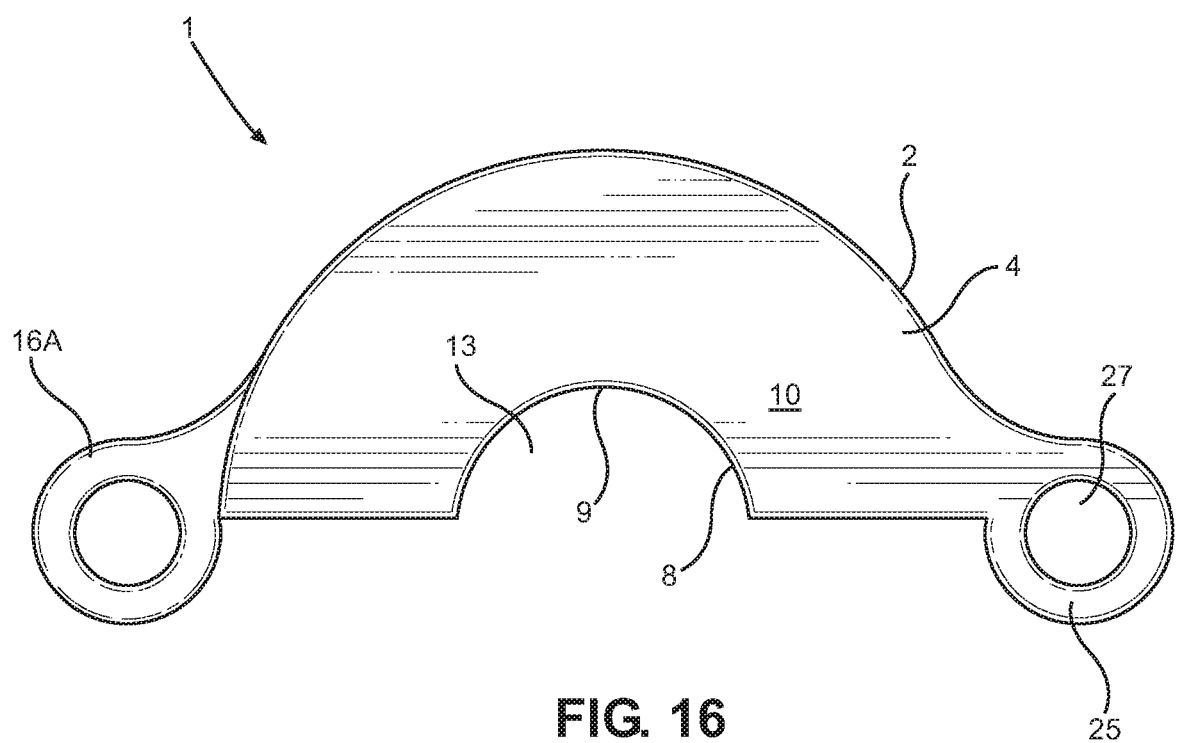
FIG. 16 is a top perspective view of an alternate embodiment of the novel removable cuff having a first portion with a first hinge structure.

FIGS. 13A and 14 show first portion 2 of removable cuff 1 having first end 4 located opposite second end 5. First end 4 of first portion 2 has first recess 9 and first flange 10. Second end 5 of first portion 2 has recess 31 and flange 29.

First portion 2 of removable cuff 1 has first hinge structure 25 and eyelet 16A having an opening. FIG. 14 depicts first hinge structure 25 protruding from first portion 2 of removable cuff 1. First hinge structure 25 has substantially central bore 27. Eyelet 16A has an opening. First portion 2 has chamber 15.

Figure 13B:
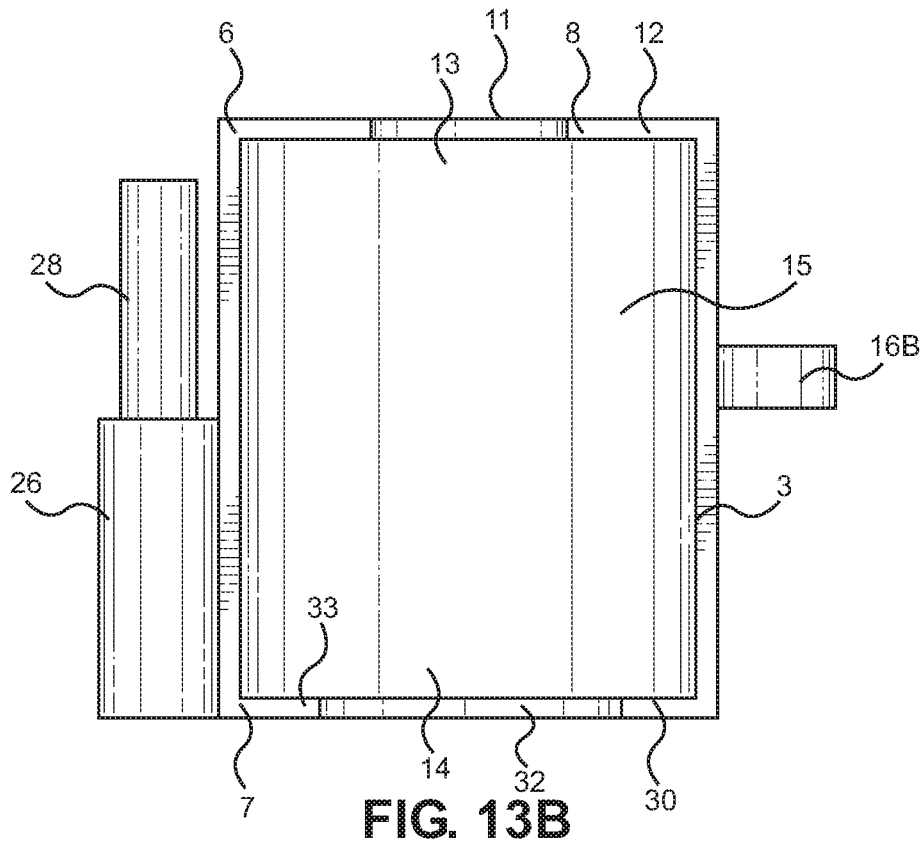
FIG. 13B is a side perspective view of an alternate embodiment of the novel removable cuff having a second portion with a secondary hinge structure.
Figure 17:
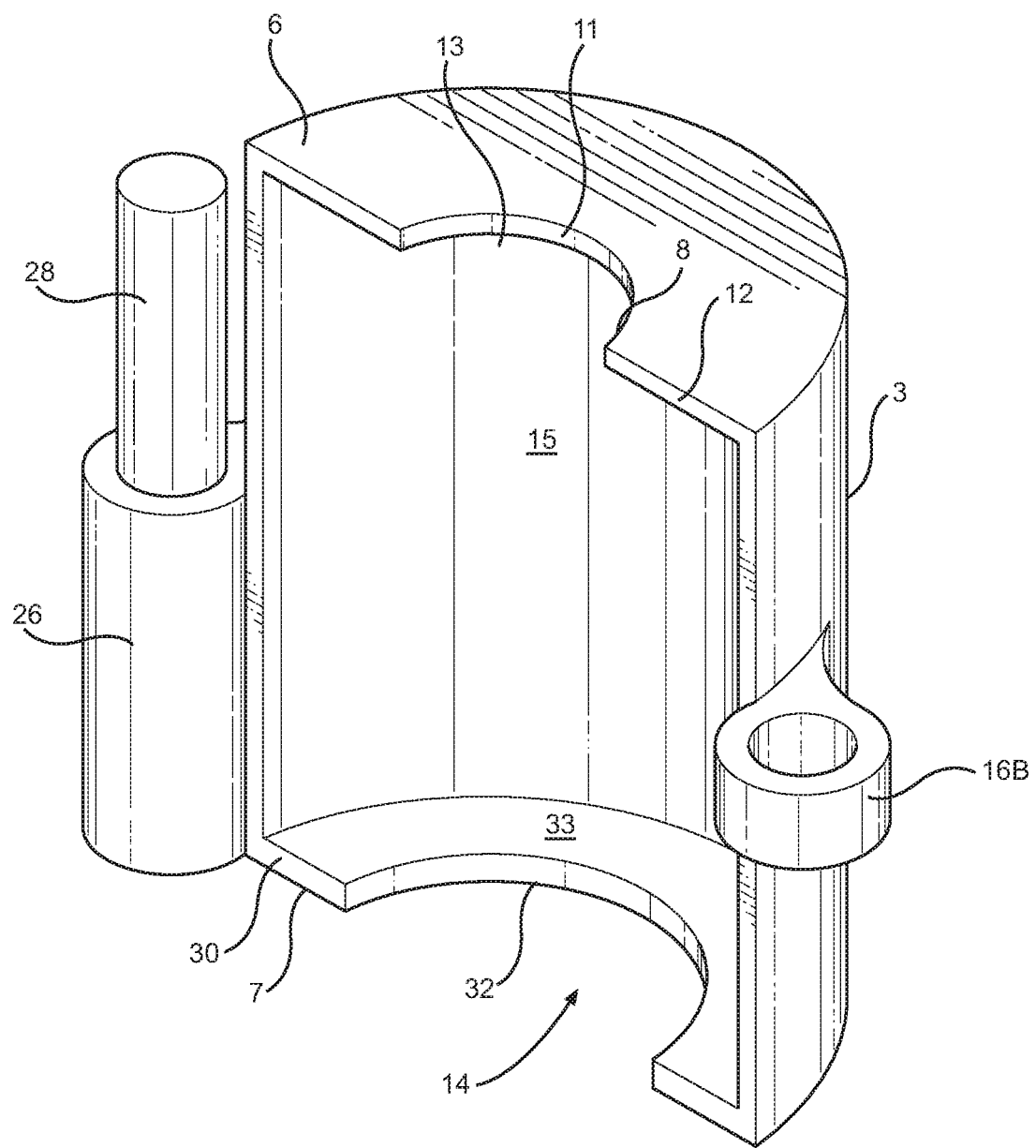
FIG. 17 is a perspective view of an alternate embodiment of the novel removable cuff having a second portion with a secondary hinge structure.
Figure 18:
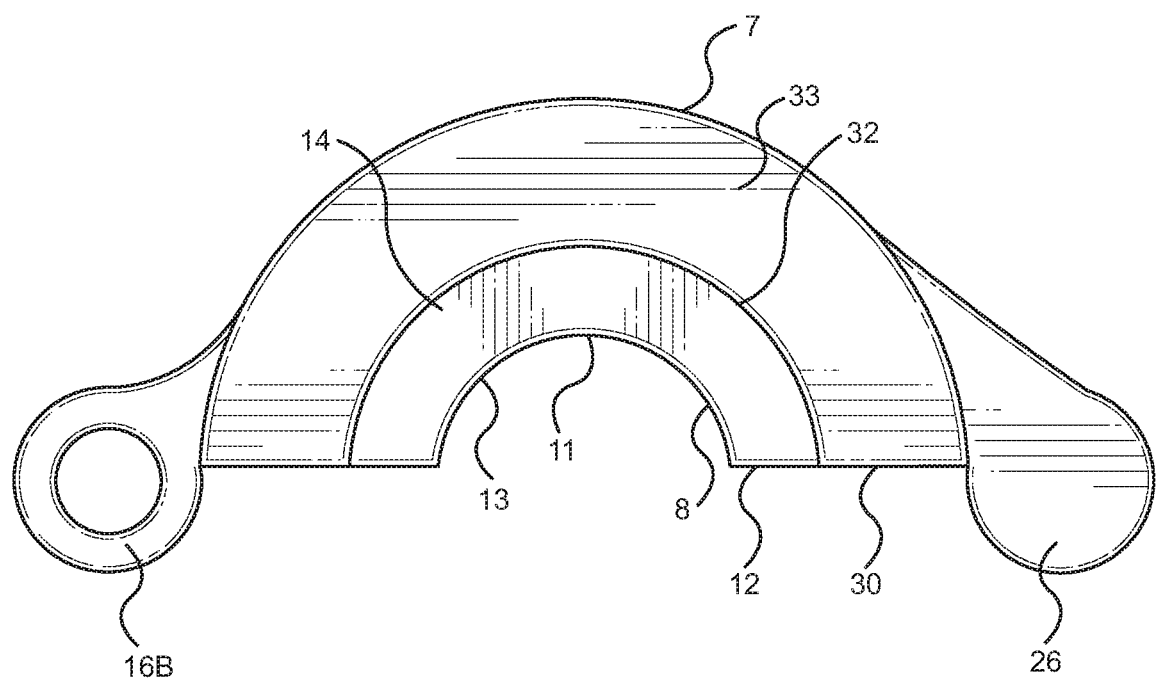
FIG. 18 is a bottom perspective view of an alternate embodiment of the novel removable cuff having a second portion with a secondary hinge structure.
Figure 19:
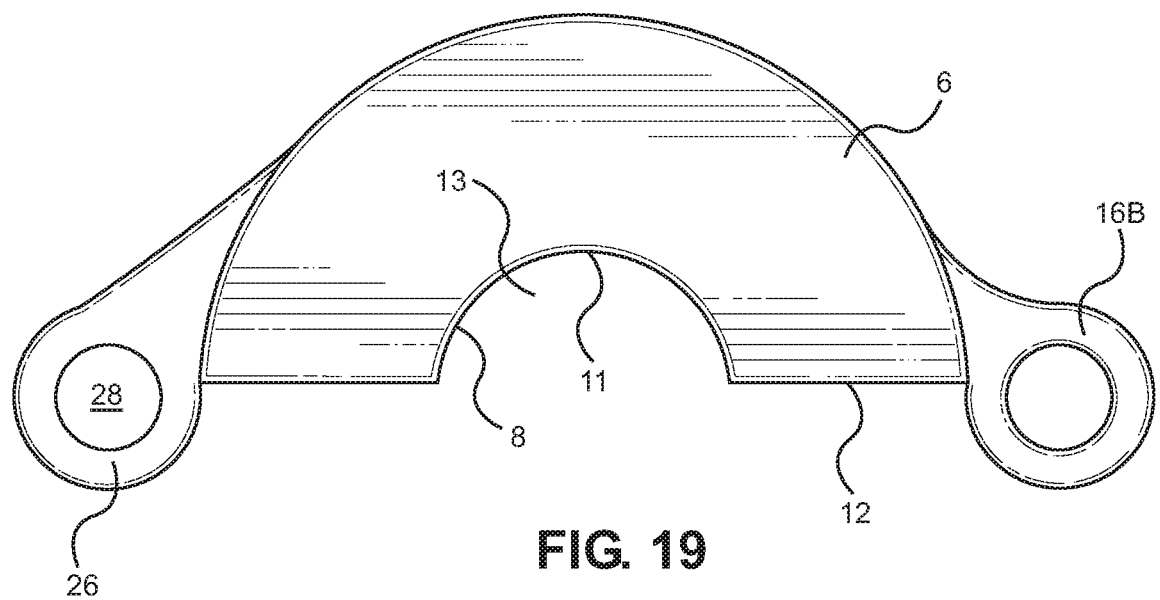
FIG. 19 is a top perspective view of an alternate embodiment of the novel removable cuff having a second portion with a secondary hinge structure.
Figure 20:
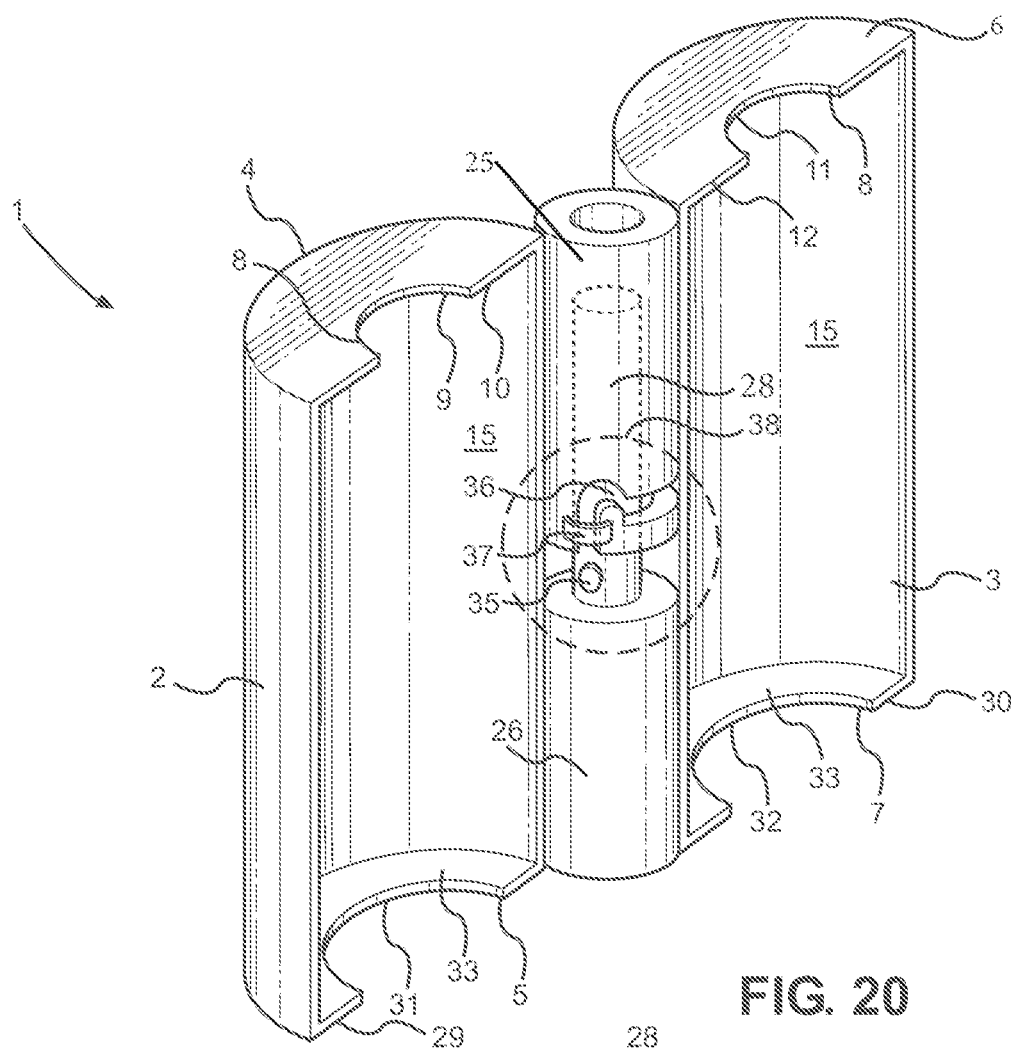
FIG. 20 is a perspective view of an alternate embodiment of the novel removable cuff in an open configuration having a locking mechanism comprising a hinge structure with a knob and channel; and, FIG. 21 is a close-up view of an alternate embodiment of the novel removable cuff having a locking mechanism comprising a hinge structure with a knob and channel.
Figure 21:
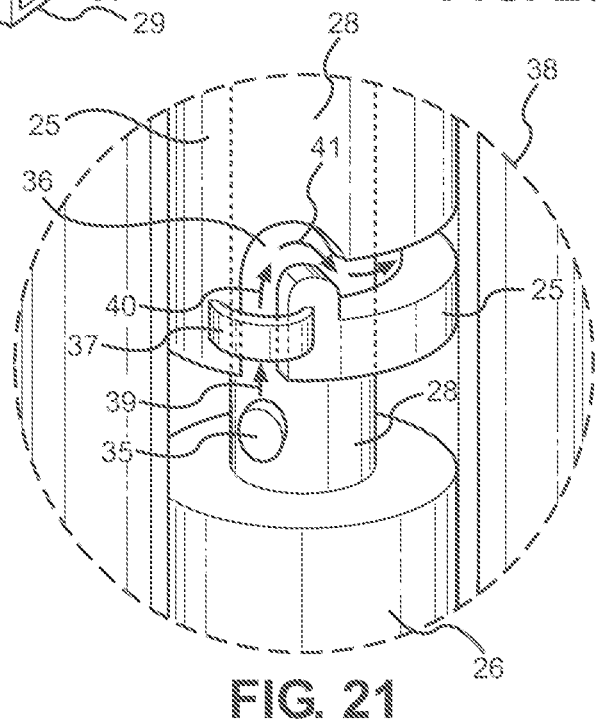

FIGS. 13B and 17 show second portion 3 of removable cuff 1 having first end 6 located opposite second end 7. First end 6 of second portion 3 has second recess 11 and second flange 12. Second end 7 of second portion 3 has recess 32 and flange 30. Second portion 3 of removable cuff 1 has second hinge structure 26 protruding from an outer wall surface of second portion 3. Second hinge structure 26 has protruding structure 28 connected thereto, whereby, protruding structure 28 is retained by said substantially central bore 27 of first hinge structure 25 when first portion 2 is connected to second portion 3 as best shown in FIGS. 11, 20, and 21. Secondary portion 3 has chamber 15.

FIGS. 20 and 21 show protruding structure 28 of second hinge structure 26 having lock mechanism 38. Lock mechanism 38 comprises knob 35 connected to an outer wall surface of protruding structure 28. First hinge 25 of first portion 2 can have channel 36. Support bridge 37 provides support for channel 36. Knob 35 is positioned 39 into channel 36. Knob 35 slides under support bridge 37, then knob 35 slides up 40 channel 36, then knob 35 slides over 41 at least a portion of first hinge 25. It is within the scope of this invention for knob 35 to be oriented over any barrier structure including, but not limited to, a hump, a bump, hill, or any feature of first hinge 25 that is capable of retaining knob 35 within channel 36. Once knob 35 enters 39 channel 36, a user could twist hinge structures 25 and 26 to orient knob 35 to slide along channel 36.

FIG. 20 shows removable cuff 1 having hose retaining structure 33. The secondary ends 5 and 7 of removable cuff 1 can have a hose retaining structure 33 configured to close off chamber 15 and to help retain hose 19. Hose retaining structure 33 is made of recess 31 of flange 29 (FIGS. 13A, 14, 15, and 20) and recess 32 of flange 30 (FIGS. 13B, 17, 18, and 20). Chamber 15 is formed from the inner wall surfaces of first portion 2 and second portion 3.

Removable cuff 1 has hose retaining structure 33 (FIGS. 13A-15, 17, 18, and 20). Hose retaining structure 33 has first recess 31 bordering first flange 29. First recess 31 bordering first flange 29 is located on second end 5 of first portion 2 of removable cuff 1. Hose retaining structure 33 has second recess 33 bordering second flange 30. Second recess 33 bordering second flange 30 is located on second end 7 of second portion 3 of removable cuff 1. Second opening 14 is formed when first portion 2 of removable cuff 1 and second portion 3 of removable cuff 1 are oriented in a closed orientation.

FIGS. 5-7 best illustrate capturing structure 8 of removable cuff 1 captures male threaded end 18 of hose bib 17 and obstructs female threaded end 20 of hose 19 from access by an unauthorized user. When removable cuff 1 is installed onto hose bib 17 in a closed orientation, male threaded end 18 of hose bib 17 and female threaded end of hose 19 are positioned within chamber 15 of removable cuff 1. Removable cuff 1 acts as a barrier from unauthorized access to male threaded end 18 of hose bib 17 and female threaded end of hose 19.

A locking mechanism can be located on an outer wall surface of removable cuff 1 such as eyelets 16A and 16B shown in FIGS. 1-7, 9, and 10-19. The eyelets 16A and 16B each have an opening capable of receiving a fastener including, but not limited to a pad lock, a zip tie, or a screw. Eyelets 16A and 16B can be oriented in any configuration such as horizontal or vertical. It is a preferred embodiment that the openings of eyelets 16A and 16B overlay each other. The first eyelet 16A and second eyelet 16B can be oriented in a parallel orientation, whereby, first eyelet 16A overlays second eyelet 16B or vice versa, when removable cuff 1 is oriented in a closed orientation. The openings of the eyelets 16A and 16B are configured to receive a removable lock.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

The invention claimed is:

1. A removable cuff configured to capture a male threaded end of a hose bib and obstruct a female threaded end of a hose, comprising:
  a hose, said hose having a female threaded end;
  a hose bib, said hose bib having a male threaded end;
  a removable cuff having a first portion, said first portion having a first end located opposite a second end;
  said removable cuff having a second portion, said second portion having a first end located opposite a second end;
  said first portion of said removable cuff having a first eyelet, said second portion of said removable cuff having a second eyelet, said first eyelet and said second eyelet are oriented in a parallel orientation, whereby, said first eyelet overlays said second eyelet when said removable cuff is oriented in a closed orientation, thereby, configured to receive a removable lock;
  said first portion of said removable cuff is hingedly connected to said second portion of said removable cuff, said first portion of said removable cuff having a first hinge structure, said first hinge structure protrudes from said first portion of said removable cuff, said first hinge structure has a substantially central bore, said second portion of said removable cuff having a second hinge structure, said second hinge structure protrudes from said second portion of said removable cuff, said second hinge structure having a protruding structure connected thereto, whereby, said protruding structure is configured to be retained by said substantially central bore of said first hinge structure, and said protruding structure is not a removable hinge pin;
  said removable cuff having a single chamber, said single chamber is formed when said first portion of said removable cuff and said second portion of said removable cuff are oriented in the closed orientation, whereby, said single chamber is configured to obstruct said female threaded end of said hose when said removable cuff is connected to said male threaded end of said hose bib;
  said removable cuff having a capturing structure comprising a first recess, said first recess bordering a first flange, said first flange being a flat rim having no annular seal and no inner wall supported by a gusset, said flat rim of said first flange projecting from said first end of said first portion of said removable cuff, said capturing structure having a second recess, said second recess of said capturing structure bordering a second flange, said second flange being a flat rim having no inner wall supported by a gusset, said flat rim of said second flange projecting from said first end of said second portion of said removable cuff;

an end of said flat rim of said first flange of said capturing structure and an end of said flat rim of said second flange of said capturing structure directly connecting to a narrow portion of said hose bib so that said male threaded end of said hose bib is captured by said end of said flat rim of said first flange and said end of said flat rim of said second flange;

said removable cuff having a hose retaining structure, said hose retaining structure comprising a first recess, said first recess bordering a first flange, said first flange being a flat rim having no inner wall supported by a gusset, said flat rim of said first flange projecting from said second end of said first portion of said removable cuff, said hose retaining structure having a second recess, said second recess bordering a second flange, said second flange being a flat rim having no annular seal and no inner wall supported by a gusset, said flat rim of said second flange projecting from said second end of said second portion of said removable cuff, said capturing structure completely overlays said hose retaining structure when said capturing structure and said hose retaining structure both form end portions of said single chamber;

a first opening, said first opening is formed when said first portion of said removable cuff and said second portion of said removable cuff are oriented in the closed orientation;

a second opening, said second opening is formed when said first portion of said removable cuff and said second portion of said removable cuff are oriented in the closed orientation;

said first opening of said removable cuff is smaller than said second opening of said removable cuff; and, at least a portion of a locking mechanism, said at least a portion of said locking mechanism is configured to be engaged to prevent removal of said female threaded end of said hose from said male threaded end of said hose bib.

2. The removable cuff of claim 1, further comprising, said at least a portion of said locking mechanism is an opening, wherein said opening is configured to receive the removable lock in communication with said first portion and said second portion of said removable cuff.

* * * * *